J. J. & T. J. HANUS & J. F. PUTZ.
COTTON PRESS.
APPLICATION FILED OCT. 5, 1914.

1,194,624.

Patented Aug. 15, 1916.
2 SHEETS—SHEET 1.

J. J. Hanus,
T. J. Hanus, and
J. F. Putz,
Inventors

Witnesses by C. A. Snow & Co.
Attorneys

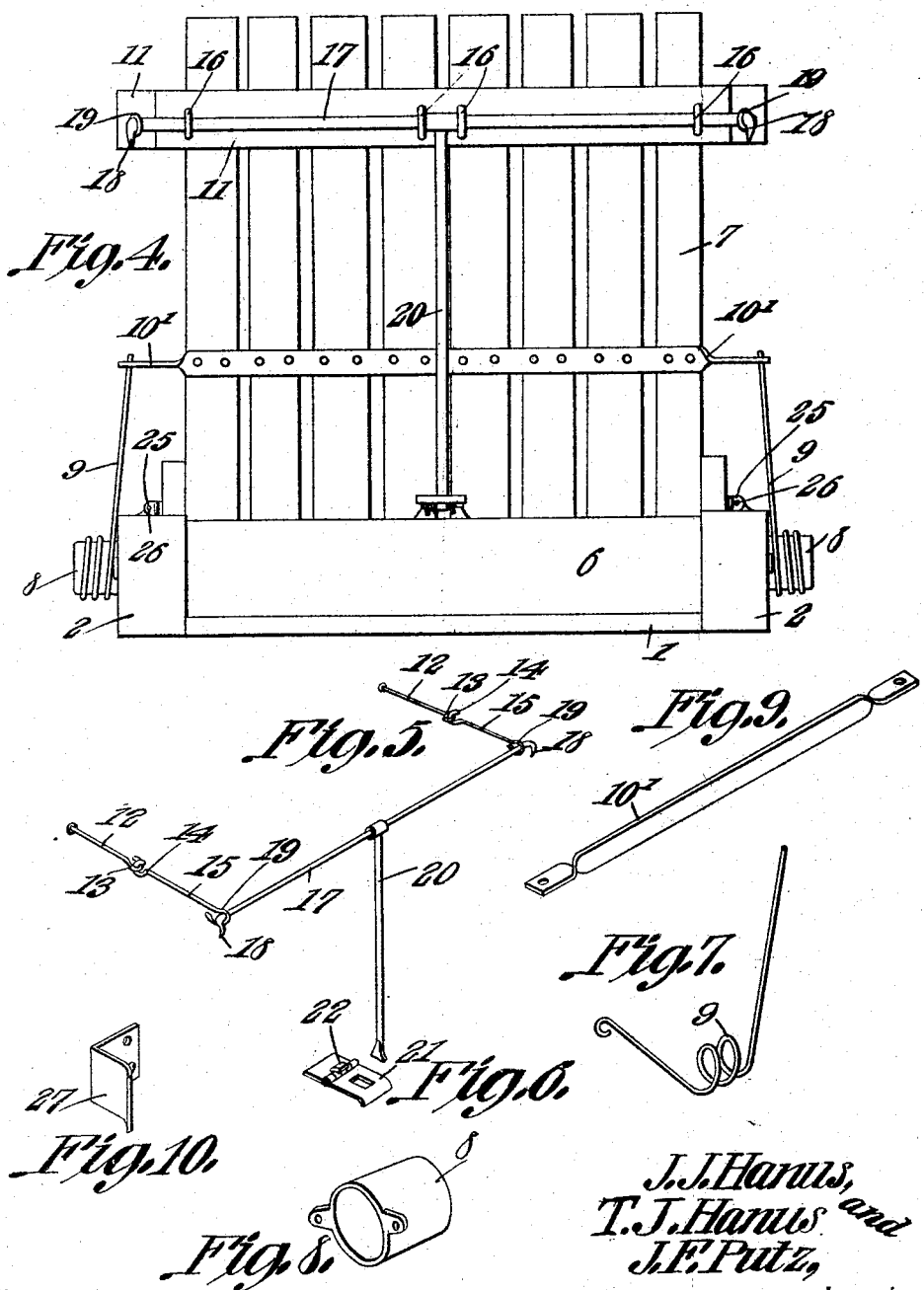

UNITED STATES PATENT OFFICE.

JOSEPH J. HANUS, TOM JOE HANUS, AND JOHN F. PUTZ, OF ENNIS, TEXAS.

COTTON-PRESS.

1,194,624.

Specification of Letters Patent. Patented Aug. 15, 1916.

Application filed October 5, 1914. Serial No. 865,186.

*To all whom it may concern:*

Be it known that we, JOSEPH J. HANUS, TOM JOE HANUS, and JOHN F. PUTZ, citizens of the United States, residing at Ennis, in the county of Ellis, State of Texas, have invented a new and useful Cotton-Press, of which the following is a specification.

This invention relates to improvements in press boxes such as used in connection with cotton baling mechanisms and the like.

Heretofore press boxes have been provided with hooks, ropes and weights for retarding the outward movement of the walls of the boxes when released, thus to prevent injury to the operator. These have been found objectionable, however, because they have been in the way of the operator who has to go around, over or under them in order to get to the compressed material and tie it.

One of the objects of the present invention is to avoid the use of these objectionable retarding means by providing a press box which can be readily opened by one man so as thus to permit tying of the bale, improved means being provided for retarding the outward movement of the walls of the press box so that they will not fly outwardly as quickly or as far as would be the case under ordinary conditions.

A further object is to provide a press box the sides of which can be easily closed together.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

Figure 1:
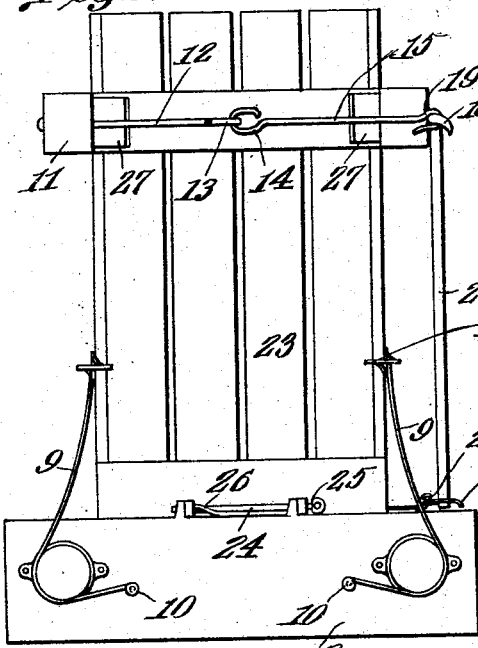
Figure 2:
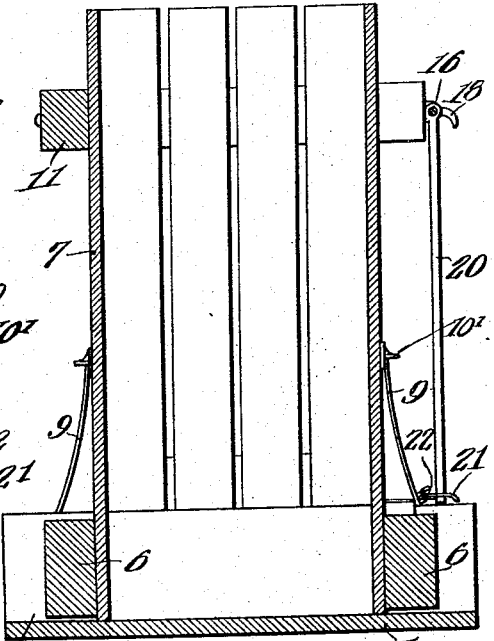
Figure 3:
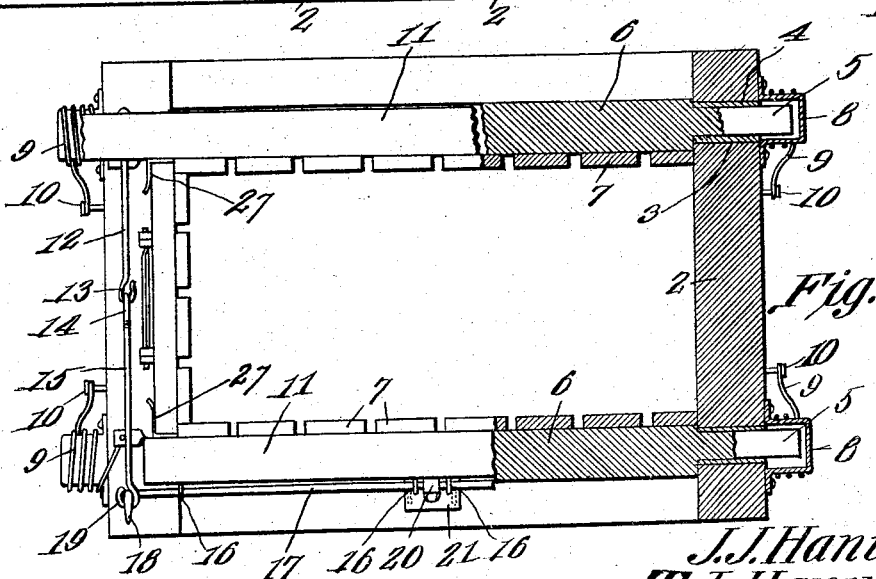

In said drawings:—Figure 1 is an end elevation of a press box having certain improvements combined therewith. Fig. 2 is a vertical transverse section therethrough. Fig. 3 is a view partly in plan and partly in section. Fig. 4 is a front elevation of a press box, the present improvements being combined therewith. Fig. 5 is a perspective view of the hooked rod, the links coöperating therewith, and the arm for actuating the rod. Fig. 6 is a perspective view of the keeper used in connection with the arm. Fig. 7 is a perspective view of one of the retarding springs. Fig. 8 is a perspective view of one of the housings used in connection with the springs. Fig. 9 is a perspective view of one of the spring engaging strips. Fig. 10 is a perspective view of one of the retaining fingers or brackets.

Referring to the figures by characters of reference, 1 designates the base of the press box having end sills 2 in which are formed openings 3 provided with metal bushings 4. These bushings form bearings for trunnions 5 extending from the ends of the bottom strips 6 of the side panels 7 of the press box. These side panels can be of any construction desired and those ends of the trunnions 5 that project through the openings 3 are extended into cap shaped housings 8 secured to the sills 2. A spring 9 is coiled about each of the caps 8, one end of the spring being attached to the sills 2, as shown at 10, while its other end is extended upwardly and is secured to a strip 10' on the side panel 7.

Each side panel has a cross strip 11 adjacent its upper end and the ends of which project laterally beyond the sides of the panel. Secured to these projecting ends of one of the side panels are rods 12 having eyes 13 engaged by corresponding eyes 14 formed upon links 15. The cross strips 11 upon the other side panel has bearings 16 in which is journaled a rod 17 extending longitudinally of the strip 11, the ends of the rod projecting beyond the ends of the strip 11 and forming hooks 18 adapted to engage eyes 19 formed at the free ends of the links 15. An arm 20 is formed integral with or secured to the rod 15 and is adapted to extend downwardly into engagement with a pivoted keeper 21 supported by the adjacent side strip 6. This keeper is preferably provided with a spring as shown 22 so as thus to be held yieldingly in active or engaging position.

The end panels 23 of the press box are of any preferred construction and are connected to the sills 2 by hinges 24 the pintles 25 of which are preferably removable. Furthermore, these hinges are preferably provided with any suitable means such as a spring 26 for holding each of the end panels 23 in either open or closed position, the spring in the present instance being in the form of a strip mounted at one end in the hinge member secured to the sill 2 and at its other end in the hinge member secured to the panel 23. This spring strip 26 is designed to spring forward to a dead center so as thus to operate to hold the panel 23 in either of the two positions mentioned.

Retaining fingers 27 are extended inwardly from the side panels 7 back of the cross strips 11 and are adapted to lap the outer faces of the end panels 3, thus to hold the end panels against outward swinging when the parts of the press are assembled for use.

When it is desired to use the press, the end panels 23 are swung to upright position after which the side panels are moved against the side edges of the end panels with the retaining fingers 27 lapping the outer faces of said end panels. The links 15 are then positioned with their eyes 19 in engagement with the hooks 18, after which lever 20 is swung downwardly so as to rotate the rod 17 and bring the hooks 18 to position where the eyes 19 cannot slip therefrom. The lower end of lever 20 is engaged by the spring supported keeper 21. With the parts thus held the material to be baled can be placed under pressure within the box and after a sufficient amount of material has accumulated within the box and while said material is being held under pressure, the operator can depress the keeper 21 so as to disengage the arm 20. Said arm will immediately swing upwardly and outwardly so as thus to bring the hooks 18 to position where the eyes 19 can slip therefrom, the expansive force exerted by the material under compression serving to shift the side panels 7 outwardly against the action of the springs 9 and likewise to shift the end panels 23 outwardly against the stress of the springs 26. Said end panels can be swung downwardly to horizontal position, springs 26 serving to hold them in their lowered position as hereinbefore stated. The material being held under compression can then be tied after which the bale thus formed can be removed and the parts returned to their upstanding positions and fastened as hereinbefore described.

It will be seen that by providing mechanism such as described the operation of releasing and tying a bale can be performed by one person without danger of injury to himself or others.

What is claimed is:—

1. The combination with a press box having hingedly mounted side and end panels, of means upon the side panels for lapping the end panels to hold them against outward movement, springs connected to the side panels for resisting the outward swinging movement thereof, means upon the side panels for tying them together to resist the expansive force of material retained in the box under compression.

2. In a press box, the combination with sills, side panels having trunnions mounted for rotation in the sills, and detachably and hingedly mounted end panels, of a cap partly housing each of the trunnions, a spring coiled about each cap and secured at one end to the adjacent sill and at its other end to the adjacent side panel, all of said springs operating to hold the panels normally elevated and to resist outward movement thereof, means upon the side panels for lapping the end panels to hold them in raised positions, a revoluble holding device upon one of the side panels, tie devices connected to the other side panel and adapted to engage the holding device, said holding device being revoluble to release the tie devices, and means for securing said holding device against rotation while in engagement with the tie devices.

3. In a press box, the combination with sills, side panels having trunnions mounted for rotation in the sills, and detachably and hingedly mounted end panels, of a cap partly housing each of the trunnions, a spring coiled about each cap and secured at one end to the adjacent sill and at its other end to the adjacent side panel, all of said springs operating to hold the panels normally elevated and to resist outward movement thereof, means upon the side panels for lapping the end panels to hold them in raised positions, a revoluble holding device upon one of the side panels, tie devices connected to the other side panel and adapted to engage the holding device, said holding devices being revoluble to release the tie devices, and means for securing said holding device against rotation while in engagement with the tie devices, said means including an arm extending from said device, and a spring controlled keeper adapted to engage the arm.

In testimony that we claim the foregoing as our own, we have hereto affixed our signatures in the presence of two witnesses.

JOSEPH J. HANUS.
TOM JOE HANUS.
JOHN F. PUTZ.

Witnesses:
J. ORAN CARTER,
R. T. BLAKEY.